(12) United States Patent
Chaumont et al.

(10) Patent No.: US 8,840,027 B2
(45) Date of Patent: Sep. 23, 2014

(54) ELECTRO-OPTICAL READER WITH ENHANCED LASER LIGHT PATTERN VISIBILITY

(75) Inventors: Chad Chaumont, Coram, NY (US); Christopher Warren Brock, Manorville, NY (US); Ian Jenkins, Stonybrook, NY (US); Jaime Weidler, South Setauket, NY (US); Sunghun Lim, Bethpage, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 589 days.

(21) Appl. No.: 12/868,093

(22) Filed: Aug. 25, 2010

(65) Prior Publication Data
US 2012/0048940 A1 Mar. 1, 2012

(51) Int. Cl.
*G06K 7/10* (2006.01)
(52) U.S. Cl.
CPC .... *G06K 7/10881* (2013.01); *G06K 2207/1011* (2013.01); *G06K 7/10594* (2013.01)
USPC ............... 235/462.21; 235/462.2; 235/462.43
(58) Field of Classification Search
CPC ............ G06K 7/10881; G06K 2207/1011; G06K 7/10683; G06K 7/10702; G02B 27/02
USPC ........................................ 235/462.2, 462.43
See application file for complete search history.

(56) References Cited

U.S. PATENT DOCUMENTS

| | | | |
|---|---|---|---|
| 4,794,239 A | 12/1988 | Allais | |
| 4,820,911 A * | 4/1989 | Arackellian et al. | 235/462.22 |
| 5,304,786 A | 4/1994 | Pavlidis et al. | |
| 5,410,141 A * | 4/1995 | Koenck et al. | 235/472.02 |
| 5,793,033 A * | 8/1998 | Feng et al. | 235/472.01 |
| 6,431,768 B1 * | 8/2002 | Nakamura | 396/348 |
| 7,350,711 B2 * | 4/2008 | He et al. | 235/462.2 |
| 7,688,524 B2 | 3/2010 | Krieg-Kowald et al. | |
| 2005/0035204 A1 * | 2/2005 | Knappert et al. | 235/462.2 |
| 2008/0142597 A1 * | 6/2008 | Joseph et al. | 235/462.21 |

* cited by examiner

Primary Examiner — Christopher Stanford
(74) Attorney, Agent, or Firm — Nong-Qiang Fan

(57) ABSTRACT

Visibility of a scan laser light pattern or an aiming laser light pattern on a symbol to be read by a hand-held, electro-optical reader is enhanced by directing laser light having a laser wavelength in the laser light pattern to the symbol, configuring an optical element to be transmissive to the laser light of the same laser wavelength, supporting the optical element by the reader, moving the optical element from a stored position to a deployed position, and viewing the laser light pattern on the symbol through the optical element in the deployed position.

17 Claims, 4 Drawing Sheets

ELECTRO-OPTICAL READER WITH ENHANCED LASER LIGHT PATTERN VISIBILITY

DESCRIPTION OF THE RELATED ART

Moving laser beam readers or laser scanners, as well as solid-state imaging systems or imaging readers, have been used to electro-optically read symbols, particularly one-dimensional Universal Product Code (UPC) bar code symbols, each having a row of bars and spaces spaced apart along one direction, and two-dimensional symbols, such as Code 49, which introduced the concept of vertically stacking a plurality of rows of bar and space patterns in a single symbol, as described in U.S. Pat. No. 4,794,239. Another two-dimensional code structure for increasing the amount of data that can be represented or stored on a given amount of surface area is known as PDF417 and is described in U.S. Pat. No. 5,304,786.

The known moving laser beam reader generally includes a scan laser for emitting a laser beam, a focusing lens assembly for focusing the laser beam to form a beam spot having a certain size at a focal plane in a range of working distances, a scan component for repetitively scanning the beam spot across a target symbol in a laser scan pattern, for example, a scan line or a series of scan lines, across the target symbol multiple times per second, e.g., forty times per second, a photodetector for detecting light reflected and/or scattered from the symbol and for converting the detected light into an analog electrical signal, and signal processing circuitry including a digitizer for digitizing the analog signal, and a microprocessor for decoding the digitized signal based upon a specific symbology used for the symbol.

The known imaging reader generally includes a solid-state imager or sensor having an array of cells or photosensors, which correspond to image elements or pixels in a field of view of the imager, an illuminating light assembly for illuminating the field of view with illumination light from an illumination light source, e.g., one or more light emitting diodes (LEDs), an imaging lens assembly for capturing return ambient and/or illumination light scattered and/or reflected from the symbol being imaged over a range of working distances, and an aiming light assembly for projecting an aiming laser light pattern or mark with aiming laser light from an aiming light source, e.g., an aiming laser, on the symbol prior to imaging. The imager may include a one- or two-dimensional charge coupled device (CCD) or a complementary metal oxide semiconductor (CMOS) device and associated circuits for producing electronic signals corresponding to a one- or two-dimensional array of pixel information over the field of view.

Both types of readers are often operated by being held in a human operator's hand and aimed at each symbol to be read. Visibility of the laser scan pattern in the moving laser beam reader or of the aiming laser light pattern in the imaging reader is important to insure that the operator accurately positions the respective pattern on and across the symbol to be read. However, sometimes, such laser light patterns are not readily visible to the operator.

For example, some semiconductor laser diodes emit laser light at a wavelength of about 7800 Angstrom units, which is very close to infrared light and is on the borderline of being visible. Even with the advent of laser diodes that emit light in the visible wavelength range, ambient light, such as outdoor sunlight or a brightly lit indoor environment, tends to mask out the laser diode light. Furthermore, if the laser diode light is moving, for example, by being swept across the symbol, and especially if the laser diode light is being swept at fast rates of speed on the order of a plurality of times per second, for example, at a rate of 40 scan lines per second and more, then the laser diode light is not readily visible to the operator, even in a darkened room. Hence, due to one or more of such factors as the wavelength of the laser light, the intensity of the laser light, the intensity of the ambient light in the environment in which the laser light is operating, the scanning rate, as well as other factors, the visibility of the laser patterns is degraded.

These non-readily visible laser patterns sometimes causes the operator to hunt around by trial and error, hope that the laser pattern is eventually properly positioned on and across the symbol, and wait until the reader advises, typically by the lighting of an indicator lamp or by the sounding of an auditory beeper, that the symbol had indeed been successfully read. This hunting technique is a less-than-efficient and time-consuming procedure for reading symbols, particularly in those applications where a multitude of symbols has to be read every hour and every day.

Increasing the intensity or brightness of the laser beam emitted by the scan laser or of the aiming light emitted by the aiming laser will increase the beam visibility. However, increasing the laser light intensity too much may violate human eye exposure laser safety standard limits. For example, a class 2 laser is limited to an output power of 1 mW over a base time interval of 250 msec, and a class 1 laser is limited to an output power of 0.39 mW over a base time interval of 10 sec. The laser light intensity cannot exceed these limits.

Accordingly, there is a need for enhancing the visibility of such laser patterns, without violating human eye exposure safety limit standards, and for enabling such readers to be readily operated outdoors in sunlight and in brightly lit indoor environments.

SUMMARY OF THE INVENTION

This invention relates to a reader for electro-optically reading a target, such as one- and/or two-dimensional bar code symbols, as well as non-symbols. The reader includes a housing, preferably one having a handle for handheld operation by an operator, and a data capture assembly supported by the housing and operative for directing laser light having a laser wavelength in a laser light pattern to the symbol, and for detecting return light from the symbol.

In one embodiment, the reader is a moving laser beam reader, which includes a scan laser for emitting the laser light as a laser beam, a scanner for sweeping the laser beam across the symbol to form the laser light pattern as a scan pattern for reflection and scattering as the return light, and a detector for detecting the return light. In another embodiment, the reader is an imaging reader, which includes an aiming laser for emitting the laser light across the symbol to form the laser light pattern as an aiming pattern, and a solid-state imager, such as a charge coupled device (CCD) or a complementary metal oxide semiconductor (CMOS) device, for detecting the return light.

In accordance with one aspect of this invention, an optical element is supported by the housing in a deployed position. The optical element is transmissive to laser light of the same laser wavelength to enable the operator to view the laser light pattern on the symbol through the optical element in the deployed position. The optical element blocks out all other wavelengths of light from other sources, thereby enhancing the visibility of the laser light pattern over other light sources, especially ambient indoor or outdoor light.

Preferably, the optical element includes a generally planar filter mounted on the housing for movement between a stored position in which the filter lies in a generally horizontal plane adjacent the housing, and the deployed position in which the filter lies in an upright plane. Advantageously, the filter is pivotably mounted on the housing. A cover may be provided to at least partly surround the housing, in which case the filter is pivotably mounted on the cover. The cover includes a closure for securing the cover onto the housing. This latter construction is particularly beneficial for retrofitting existing readers, as opposed to new readers in which the optical element is built into the reader at the factory. Alternatively, the housing may be provided with a mounting slot, in which case the filter is pivotably mounted on a mounting tab that is received in the mounting slot. In another variant, the filter is mounted on a sleeve that is mounted on the housing with a snap action.

Another feature of this invention resides, briefly stated, in a method of enhancing visibility of a laser light pattern on a symbol to be read by a hand-held, electro-optical reader. The method is performed by directing laser light having a laser wavelength in the laser light pattern to the symbol, configuring an optical element to be transmissive to laser light of the same laser wavelength, supporting the optical element in a deployed position by the reader, and viewing the laser light pattern on the symbol through the optical element in the deployed position.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
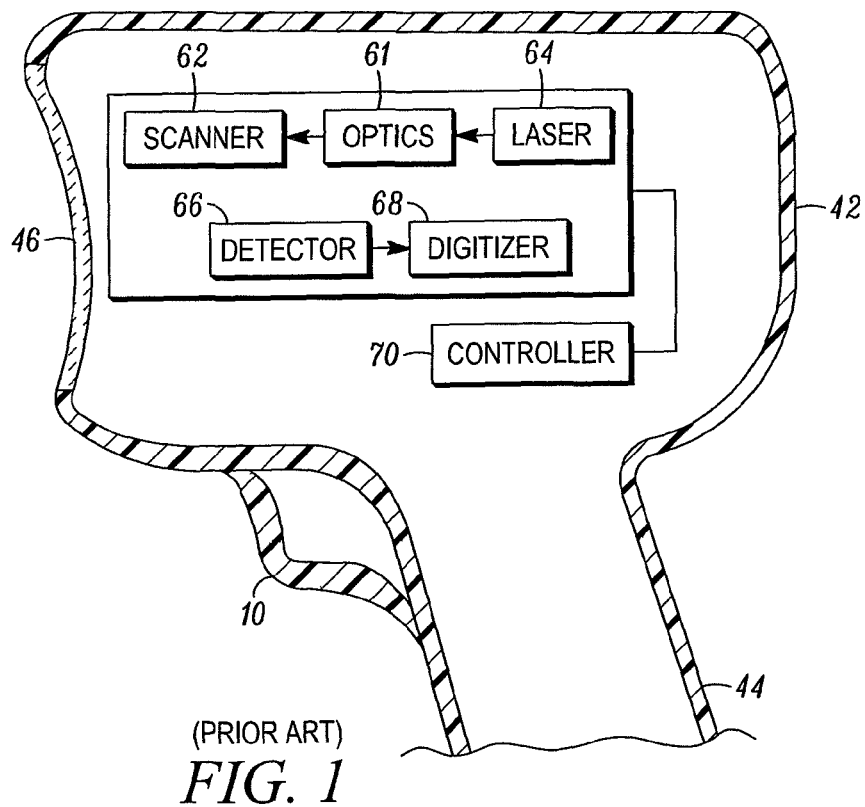
FIG. 1 is a schematic diagram of a handheld moving laser beam reader for electro-optically reading a symbol in accordance with the prior art.

FIG. 1 depicts a known moving laser beam reader 40 for electro-optically reading a target or indicia, such as a symbol, that may use, and benefit from, the present invention. The laser beam reader 40 includes a scanner 62 in a handheld housing 42 having a handle 44 on which a trigger 10 for initiating reading is mounted. The scanner 62 is operative for scanning an outgoing laser beam from a scan laser 64 and/or a field of view of a light detector or photodiode 66 in a scan laser light pattern, typically comprised of one or more scan lines, multiple times per second, for example, forty times per second, through a housing window 46 across the symbol for reflection or scattering therefrom as return light detected by the photodiode 66 during reading. The laser beam reader 40 also includes a focusing lens assembly or optics 61 for optically modifying the outgoing laser beam to have a large depth of field, and a digitizer 68 for converting an electrical analog signal generated by the detector 66 from the return light into a digital signal for subsequent decoding by a microprocessor or controller 70 into data indicative of the symbol being read.

In operation of the laser beam reader 40, the controller 70 sends a command signal to drive the scan laser 64 and the scanner 62 to project the scan laser light pattern away from the reader 40. The operator must be able to see the laser scan pattern to accurately position the laser scan pattern on and across the symbol to be read.

Figure 2:
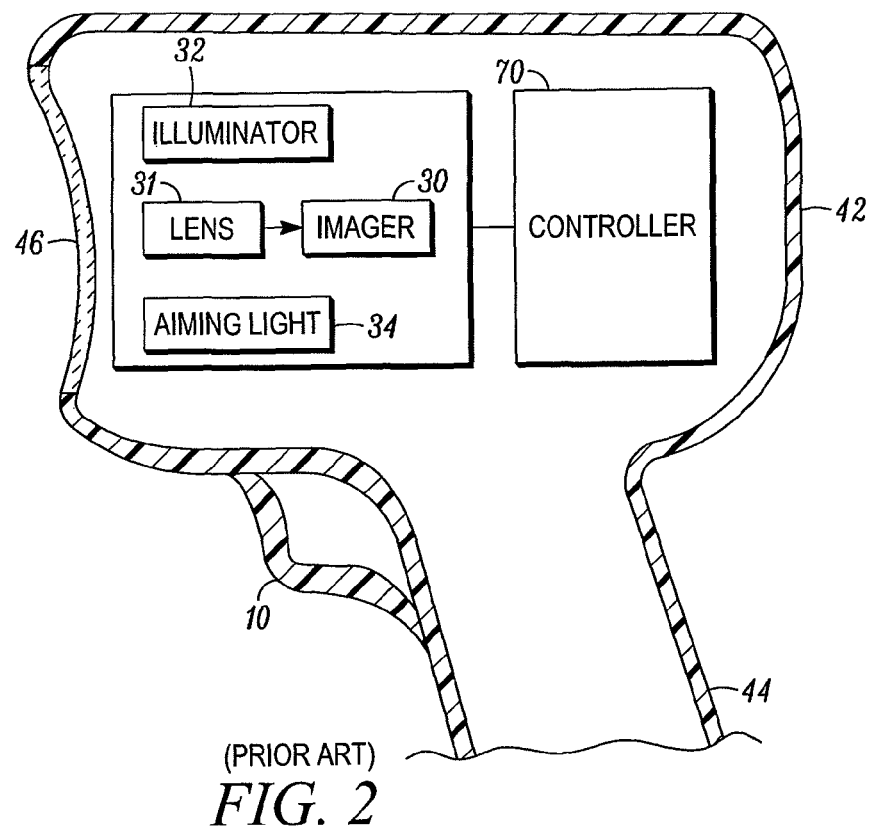
FIG. 2 is a schematic diagram of a handheld imaging reader for electro-optically reading a symbol in accordance with the prior art.

FIG. 2 depicts a known imaging reader 50 for imaging targets, such as indicia or symbols to be electro-optically read, as well as non-symbols, which may use, and benefit from, the present invention. The imaging reader 50 includes a one- or two-dimensional, solid-state imager 30, preferably a CCD or a CMOS array, mounted in the handheld housing 42 having the handle 44 on which the trigger 10 for initiating reading is mounted. The imager 30 has an array of image sensors operative, together with an imaging lens assembly 31, for capturing return light reflected and/or scattered from the target through the housing window 46 during the imaging to produce an electrical signal indicative of a captured image for subsequent decoding by the controller 70 into data indicative of the symbol being read, or into a picture of the target.

When the reader 50 is operated in low light or dark ambient environments, the imaging reader 50 includes an illuminator 32 for illuminating the target during the imaging with illumination light directed from an illumination light source through the window 46. Thus, the return light may be derived from the illumination light and/or ambient light. The illumination light source comprises one or more light emitting diodes (LEDs). An aiming laser light assembly is also provided for projecting an aiming laser light pattern or mark with aiming laser light from an aiming light source, e.g., an aiming laser 34, on the target prior to imaging.

In operation of the imaging reader 50, the controller 70 sends a command signal to initially drive the aiming laser 34 to project the aiming laser light pattern on the target. The operator must be able to see the aiming laser light pattern to accurately position the aiming laser light pattern on and across the target to be imaged. Then, the controller 70 sends a command signal to drive the illuminator LEDs 32 for a short time period, say 500 microseconds or less, and energizes the imager 30 during an exposure time period of a frame to collect light from the target during said time period. A typical array needs about 16-33 milliseconds to read the entire target image and operates at a frame rate of about 30-60 frames per second. The array may have on the order of one million addressable image sensors.

In accordance with one aspect of this invention, it is desired to enhance the visibility of the laser scan pattern or the aiming laser light pattern, despite the presence of other bright light sources, especially ambient indoor or outdoor light, by supporting an optical element 80 (see FIG. 3) by the housing 42 in a deployed position. The optical element 80 is transmissive to the laser light of the same laser wavelength to enable an operator, as represented by an eye 82 in FIG. 3, to view the laser light pattern on the symbol or target along a direct line-of-sight 84 through the optical element 80 in the deployed position illustrated in FIG. 3. For example, if the scan laser 64 or the aiming laser 34 emits a red beam having a wavelength in a range from about 630 nm to about 740 nm, then the optical element 80 is transmissive to laser light having the same range of wavelengths. The optical element 80 blocks out all other wavelengths of light from other sources outside of this range, thereby enhancing the visibility of the laser light pattern.

Figure 3:
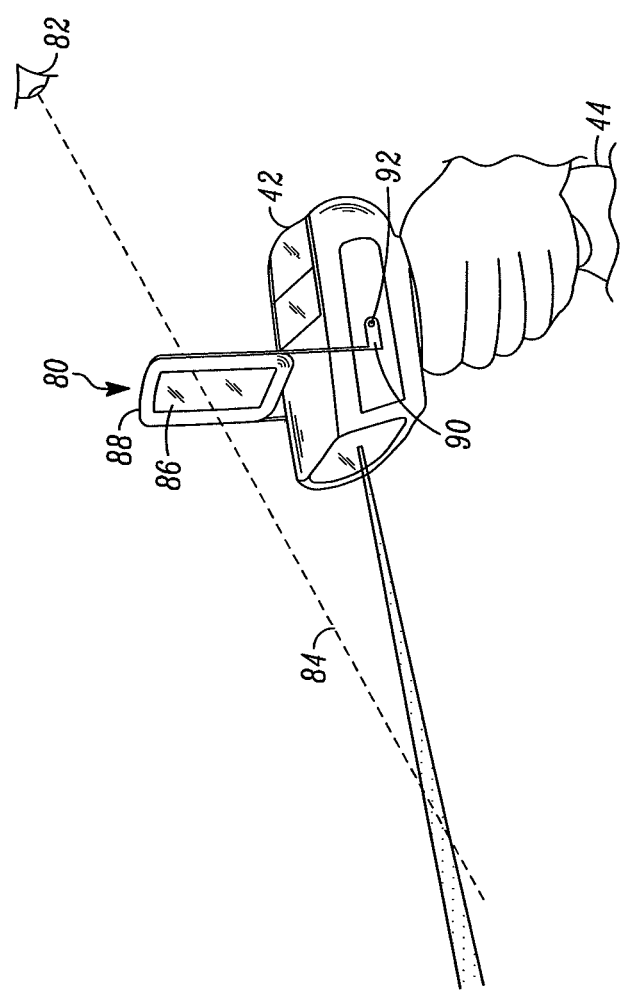
FIG. 3 is a perspective view depicting how an optical element in a deployed position enhances visibility of a laser light pattern generated by either the reader of FIG. 1 or the reader of FIG. 2 in accordance with one embodiment of the present invention.

The optical element 80 of FIG. 3 includes a generally planar filter 86 surrounded by a rectangular frame 88 and mounted on the housing for movement between a stored position and the deployed position. The optical element 80 lies in a generally horizontal plane adjacent the housing 42 in the stored position (compare with FIG. 8), and lies in an upright plane (see FIG. 3) in the deployed position. The upright plane can be vertical or slightly rearwardly or forwardly inclined. The frame 88 is pivotably mounted on the housing 42 by a pair of mounting lugs 90 at opposite sides of, and straddling, the housing 42, and a pair of pivot journals 92 that extend through the lugs 90 and into the housing 42.

Figure 5:
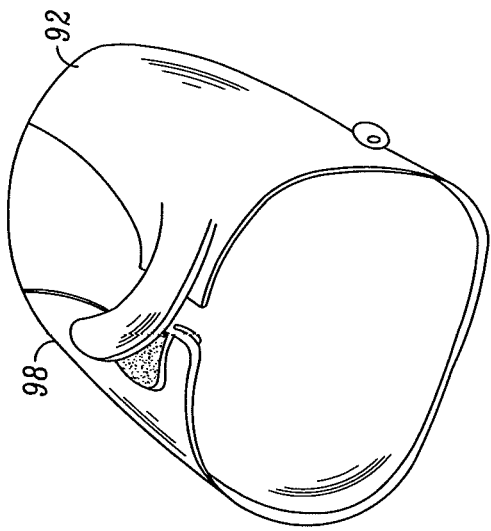
FIG. 5 is a perspective view from below of the embodiment of FIG. 4.
Figure 4:
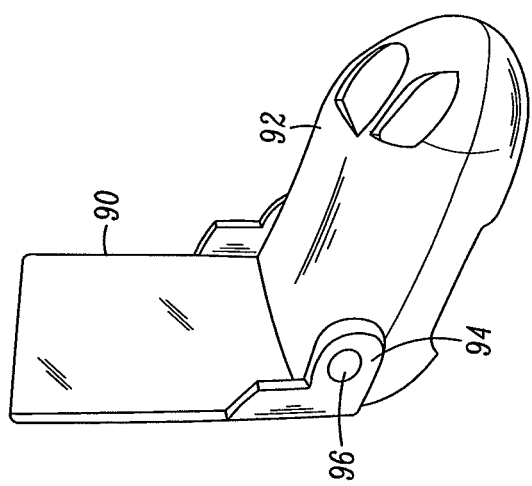
FIG. 4 is a perspective overhead view of another embodiment of an optical element in a deployed position in isolation in accordance with the present invention.

Another embodiment of an optical element 90 is shown in FIGS. 4-5, in which the frame 88 has been eliminated, and the entire optical element 90 is constituted as a filter. A jacket or cover 92 at least partly surrounds the housing 42, preferably with a snug fit. Preferably, the cover 92 is made of Neoprene (trademark) or like material. The optical element 90 is pivotably mounted on the cover 92 by a pair of mounting lugs 94 at opposite sides of, and straddling, the cover 92, and a pair of pivot journals 94 that extend through the lugs 92 and into the cover 92. As seen in FIG. 4, the cover 92 includes a closure 98 for securing the cover 92 onto the housing 24. Advantageously, the closure 98 is a hook-and-loop-type fastener. This construction is particularly beneficial for retrofitting existing readers, as opposed to new readers in which the optical element is built into the reader at the factory.

Figure 8:
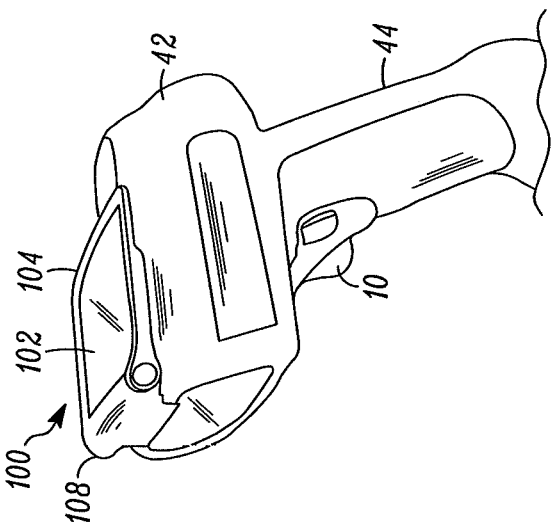
FIG. 8 is a perspective view of the embodiment of FIG. 6 in a stored position.
Figure 6:
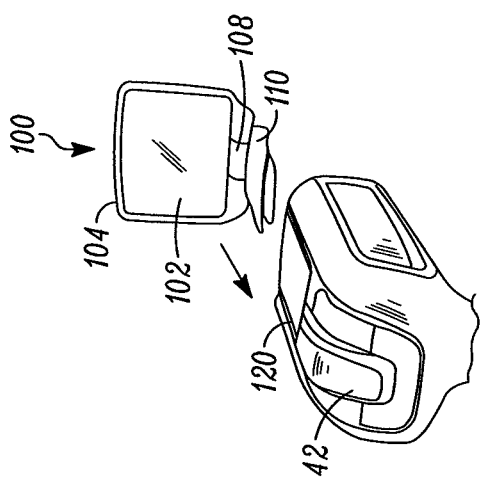
FIG. 6 is an exploded perspective view of yet another embodiment of an optical element for mounting on a reader in accordance with the present invention.
Figure 7:
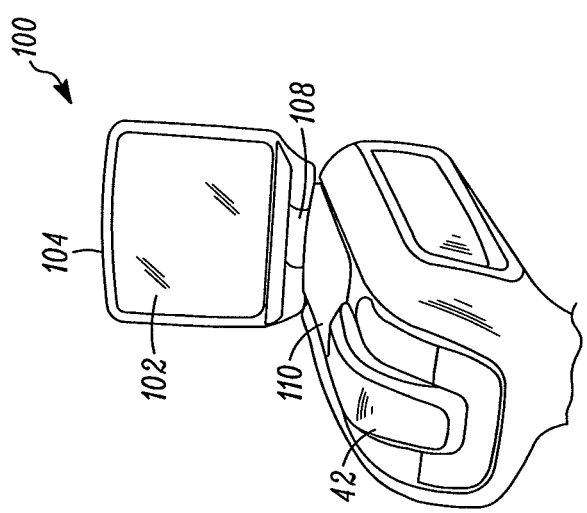
FIG. 7 is a perspective view of the embodiment of FIG. 6 in a deployed position.

Still another embodiment of an optical element 100 is shown in FIGS. 6-8, in which the housing 42 is provided with a shoe or mounting slot 120. The optical element 100 of FIGS. 6-8 includes a generally planar filter 102 surrounded by a rectangular frame 104. The frame 104 is pivotably connected by a hinge 108 to a mounting tab 110 that is slidably received in, or slidably removed from, the mounting slot 120. The optical element 100 lies in a generally horizontal plane adjacent the housing 42 in the stored position (see FIG. 8), and lies in an upright plane (see FIG. 7) in the deployed position.

It will be understood that each of the elements described above, or two or more together, also may find a useful application in other types of constructions differing from the types described above. For example, the optical element need not be rectangular as shown, but can have a myriad of other shapes, e.g., circular. The optical element need not extend upwardly or be raised in the deployed position, but can extend away from the housing in other directions, e.g., laterally. The optical element may be comprised of a plurality of telescoping portions, in which event the movement between the stored and deployed positions is accomplished not by pivoting the various telescoping portions, but by expanding them apart and collapsing them together. The optical element may be mounted on the housing such that the optical element is at least partly received in the housing in the stored position. In another variant, the optical element may be mounted on a sleeve that is mounted on the housing with a snap action, in which event the optical element is remote from the housing in the stored position. The scan laser 64 or the aiming laser 34 need not emit a red beam, but other wavelengths and ranges are contemplated.

While the invention has been illustrated and described as embodied in electro-optical readers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A reader for electro-optically reading a symbol, comprising:
    a housing held by an operator;
    a data capture assembly supported by the housing for directing laser light having a laser wavelength in a laser light pattern to the symbol, and for detecting return light from the symbol, wherein the laser wavelength is in the range from 630 nm to 740 nm; and
    an optical element supported by the housing in a deployed position, the optical element being transmissive to laser light of said laser wavelength to enable the operator to view the laser light pattern on the symbol through the optical element in the deployed position, wherein the optical element blocks out all other wavelengths of light from other sources outside of the range from 630 nm to 740 nm for enhancing the visibility of the laser light pattern, wherein the optical element includes a generally planar filter mounted on the housing for movement between a stored position in which the filter lies in a generally horizontal plane adjacent the housing, and the deployed position in which the filter lies in a vertical plane perpendicular to the housing.

2. The reader of claim 1, wherein the housing has a handle held by the operator during the reading, and a trigger mounted on the handle for initiating the reading and for actuating a controller to control the data capture assembly.

3. The reader of claim 1, wherein the data capture assembly includes a scan laser for emitting the laser light as a laser beam, a scanner for sweeping the laser beam across the symbol to form the laser light pattern as a scan pattern for reflection and scattering as the return light, and a detector for detecting the return light.

4. The reader of claim 1, wherein the data capture assembly includes an aiming laser for emitting the laser light across the symbol to form the laser light pattern as an aiming pattern, and a solid-state imager for detecting the return light.

5. The reader of claim 1, wherein the optical element includes a filter pivotably mounted on the housing.

6. The reader of claim 1, wherein the optical element includes a filter, and a cover that at least partly surrounds the housing; and wherein the filter is pivotably mounted on the cover.

7. The reader of claim 6, wherein the cover includes a closure for securing the cover onto the housing.

8. The reader of claim 1, wherein the housing includes a mounting slot; wherein the optical element includes a filter, and a mounting tab received in the mounting slot; and wherein the filter is pivotably mounted on the mounting tab.

9. An accessory for a hand-held, electro-optical reader that directs laser light having a laser wavelength in a laser light pattern to a symbol to be read, the accessory comprising:

an optical element supported by the reader in a deployed position, the optical element being transmissive to laser light of said laser wavelength to enable an operator to view the laser light pattern on the symbol through the optical element in the deployed position, wherein the optical element blocks out all other wavelengths of light from other sources outside of the range from 630 nm to 740 nm for enhancing the visibility of the laser light pattern, wherein the optical element includes a generally planar filter mounted on the housing for movement between a stored position in which the filter lies in a generally horizontal plane adjacent the housing, and the deployed position in which the filter lies in a vertical plane perpendicular to the housing, wherein the laser wavelength is in the range from 630 nm to 740 nm.

10. The accessory of claim 9, wherein the optical element includes a filter pivotably mounted on the reader.

11. The accessory of claim 9, wherein the optical element includes a filter, and a cover that at least partly surrounds the reader; and wherein the filter is pivotably mounted on the cover.

12. The accessory of claim 9, wherein the reader includes a mounting slot; wherein the optical element includes a filter, and a mounting tab received in the mounting slot; and wherein the filter is pivotably mounted on the mounting tab.

13. A method of enhancing visibility of a laser light pattern on a symbol to be read by a hand-held, electro-optical reader, the method comprising the steps of:

directing laser light having a laser wavelength in the laser light pattern to the symbol;

configuring an optical element as a generally planar filter to be transmissive to laser light of said laser wavelength by mounting the filter on the reader for movement between a stored position in which the filter lies in a generally horizontal plane adjacent the reader, and a deployed position in which the filter lies in a vertical plane perpendicular to the reader, wherein the optical element blocks out all other wavelengths of light from other sources outside of the range from 630 nm to 740 nm for enhancing the visibility of the laser light pattern, wherein the laser wavelength is in the range from 630 nm to 740 nm;

supporting the optical element in the deployed position by the reader; and viewing the laser light pattern on the symbol through the optical element in the deployed position.

14. The method of claim 13, wherein the configuring step includes configuring the optical element as a filter pivotably mounted on the reader.

15. The method of claim 13, wherein the configuring step includes configuring the optical element as a filter; and at least partly surrounding the reader with a cover; and pivotably mounting the filter on the cover.

16. The method of claim 13, and providing a mounting slot on the reader; wherein the configuring step includes configuring the optical element as a filter with a mounting tab; and receiving the mounting tab in the mounting slot; and pivotably mounting the filter on the mounting tab.

17. The method of claim 13, wherein the viewing step is performed along a direct line-of-sight through the optical element.

* * * * *